Patented Oct. 12, 1937

2,095,612

UNITED STATES PATENT OFFICE 2,095,612

DICHLORO-ALKYL ETHERS

Howard S. Nutting, Edgar C. Britton, and Donald H. Croope, Midland, Mich., assignors to The Dow Chemical Company, Midland, Mich., a corporation of Michigan No Drawing. Application February 8, 1934, Serial No. 710,312

25 Claims. (Cl. 260—151)

This invention concerns a method of making dichloro-alkyl ethers by reacting normal olefines with hypochlorous acid. It particularly concerns the preparation of beta-beta'-dichloro-ethyl ether by reacting ethylene with hypochlorous acid, but also concerns a new compound, dichloro-butyl ether, which is prepared from normal butylene by the same general method.

It is well known that ethylene chlorohydrin may be prepared by reacting ethylene with aqueous hypochlorous acid. The reaction is usually carried out by passing chlorine and somewhat more than a molecular equivalent of ethylene into water while stirring and maintaining the latter at a temperature below 20° C. The chlorine is dissolved in the water to form an aqueous solution of hydrochloric and hypochlorous acids and the latter reacts with the ethylene to form the ethylene chlorohydrin product, the reactions involved being illustrated by the following equations:—

(1) $Cl_2 + H_2O \rightarrow HCl + HClO$
(2) $HClO + CH_2{:}CH_2 \rightarrow CH_2Cl{-}CH_2OH$ The reaction is usually stopped when the reaction mixture contains about 6–8 per cent by weight of the chlorohydrin, i. e. when approximately 1 mole of ethylene has been reacted per kilogram of water, since it has previously been recognized that if the reaction is carried further, by-products, particularly ethylene chloride, are formed in considerable amount. By stopping the reaction at the point just mentioned, nearly all of the ethylene reacted is converted into ethylene chlorohydrin.

In the above described process, a very small proportion of beta-beta'-dichloro-ethyl ether is sometimes formed, but in such low yield that its formation is not of commercial importance. It is an object of the present invention to produce beta-beta'-dichloro-ethyl ether in increased yield, i. e. in at least 5 per cent yield, by reacting ethylene with hypochlorous acid under the modified conditions hereinafter described.

We have found that when an aqueous hypochlorous acid solution contains 3 moles or more of ethylene chlorohydrin per kilogram of water, i. e. a considerably higher concentration of ethylene chlorohydrin than is produced in the above described usual process, ethylene can be reacted therewith to form not only ethylene chlorohydrin and ethylene chloride, but also a good yield of beta-beta'-dichloro-ethyl ether. The reaction for the formation of the ether is illustrated by the equation:—

(3) $2HClO + 2CH_2{:}CH_2 \rightarrow (CH_2Cl{-}CH_2)_2O + H_2O$

The reactions illustrated by Equations (2) and (3) occur concurrently when ethylene is introduced into an aqueous solution of hypochlorous acid and ethylene chlorohydrin, but as the ratio of ethylene chlorohydrin to water in the reaction mixture increases, the proportion of ethylene undergoing conversion to form additional ethylene chlorohydrin decreases, while the proportion undergoing conversion to beta-beta'-dichloro-ethyl ether becomes increasingly greater. Thus, by passing ethylene and chlorine into water in the usual manner until considerably more than 3 moles, e. g. from 5 to 10 moles or more, of ethylene have been reacted per kilogram of water used, beta-beta'-dichloro-ethyl ether is formed in good yield.

We have further discovered that water-soluble metal salts, particularly sulphates, catalyze the formation of the ether. By carrying the reaction out in the presence of such salt the yield of ether can be increased appreciably and in some instances can be more than doubled.

We have also found that other normal olefines, e. g. propylene, normal butylenes, etc., can be converted into the corresponding dichloro-alkyl ethers by similar treatment. For instance, we have prepared the new compound, dichloro-butyl ether, by reacting butylene-1 with chlorine water in accordance with our method.

The invention, accordingly, consists in the method and new compound hereinafter fully described and particularly pointed out in the claims, the following description and examples setting forth in detail only certain of the various ways in which the principle of the invention may be employed.

The most essential step in our method consists in passing a normal olefine, e. g. ethylene, propylene, or a normal butylene, amylene, etc., into an aqueous hypochlorous acid solution which contains the chlorohydrin of said olefine in a concentration sufficient to promote the formation of the dichloro-ether product in good yield. The concentration of chlorohydrin required to produce such result is dependent upon the particular olefine under treatment. In order to produce beta-beta'-dichloro-ethyl ether in good yield, the solution should contain at least 3 moles of ethylene chlorohydrin per kilogram of water. The concentration of chlorohydrin required to convert the higher olefines into the corresponding dichloro-ethers is considerably lower. For instance, propylene can be reacted with hypochlorous acid, which contains only a trace of propylene chlorohydrin, to form dichloro-propyl ether. In all cases, however, the yield of the ether product becomes higher as the concentration of the olefine chlorohydrin is increased.

A hypochlorous acid solution containing the chlorohydrin in the necessary concentration may, of course, be formed either by reacting an olefine with hypochlorous acid (see Equation 2) or by adding the chlorohydrin to said acid. The reaction may be carried out at any desired pressure and at any temperature between the freezing point of the reaction mixture and 100° C., but can most conveniently be carried out at approximately atmospheric pressure and at between 0° and 80° C.

The hypochlorous acid employed in the process may be prepared in any desired manner, for instance by acidifying an aqueous solution or mixture of a metal hypochlorite, e. g. sodium hypochlorite, bleaching powder, etc. As an illustration of such mode of operation, a dichloro-alkyl ether may be prepared by passing an olefine into a concentrated, but slightly acid, solution of sodium hypochlorite and, during introduction of the olefine, mineral acid may be added from time to time in amount sufficient to liberate hypochlorous acid as it is consumed in the reaction. We find it most convenient, however, to prepare the hypochlorous acid during the reaction by passing chlorine into the aqueous reaction mixture. For instance, chlorine may be passed into water to form hypochlorous acid and the olefine may simultaneously be introduced into the solution to react with the hypochlorous acid as rapidly as the latter is formed. The solution is preferably stirred during such operation so as to dissolve the chlorine prior to contacting the latter with the olefine. The chlorine and olefine may be employed in any desired ratio, but the yield of ether product is highest when between 1 and 3 moles of olefine are employed per mole of chlorine.

The yield of dichloro-alkyl ether can be increased considerably by dissolving a water-soluble metal salt, e. g. a chloride or sulphate of sodium, potassium, calcium, copper, magnesium, etc., in the hypochlorous acid solution prior to reacting the olefine therewith. Such salts, particularly the sulphates, exhibit a selective catalytic action in promoting formation of the dichloro-alkyl ether in high yield, and the alkali metal sulphates are especially active catalysts for such purpose. The salt may be employed in any desired concentration, but preferably is employed as an at least 3-normal aqueous solution thereof.

In preparing beta-beta'-dichloro-ethyl ether by our method we prefer to pass chlorine and approximately its molecular equivalent of ethylene separately, but simultaneously, into a 4-normal aqueous solution of one of the aforementioned salts, preferably sodium sulphate, while stirring the reaction mixture. The introduction of the gaseous reactants is continued until at least 3 moles, preferably more than 5 moles, of ethylene has been reacted per kilogram of water employed. The hydrogen chloride generated by the reaction usually remains largely dissolved in the reacting mixture. As the reaction is continued the proportion of ethylene converted to beta-beta'-dichloro-ethyl ether becomes increasingly greater. The reacted mixture is usually obtained in the form of two layers:—an oily layer, consisting largely of ethylene chloride and beta-beta' dichloro-ethyl ether, and an acidic aqueous layer having ethylene chlorohydrin dissolved therein. The aqueous layer is separated and partially neutralized to leave it only slightly acid and is then distilled up to about 95° C. at atmospheric pressure to obtain a low boiling fraction of distillate which separates into an oily layer and an aqueous layer. The two layers of distillate are separated, the oily layer being combined with that separated from the crude reacted mixture and the aqueous layer being returned to the still. The distillation is then continued to separate the chlorohydrin product. The combined oily layers are dried, e. g. over sodium sulphate, and fractionally distilled to separate the ethylene chloride and dichloro-ethyl ether products.

The following table shows the results obtained in a number of experiments wherein dichloro-ethyl ether was prepared by our method. The procedure followed in carrying out each experiment was to pass chlorine and approximately an equal volume of ethylene separately, but simultaneously, into water or an aqueous solution having the composition stated in the table at such rate that the chlorine was completely absorbed in the aqueous reaction mixture. The latter was stirred continuously during said operation. The introduction of the gaseous reactants was continued until the desired quantity of ethylene had been reacted, after which the products were separated by fractionally distilling the mixture. Each yield of product stated in the table is the percentage yield, based on the quantity of ethylene reacted.

A comparison of Examples 1 and 3 of the table shows that under otherwise identical operating conditions an increase in the proportion of ethyl-

*Table*

| Example No. | Beginning materials | | | | | Gas flow gm. moles / hour | | Reaction temp. °C. | Ethylene reacted gm. moles | Gm. moles of ethylene reacted per kg. of H₂O used | Percentage yields | | |
|---|---|---|---|---|---|---|---|---|---|---|---|---|---|
| | Aqueous solution | | | Gaseous reactants | | | | | | | | | |
| | H₂O gms. | Ethylene chlorohydrin gms. | Catalyst —kind and quantity | Cl₂ gm. moles | Ethylene gm. moles | Cl₂ | Ethylene | | | | Ethylene chlorohydrin | Ethylene chloride | Dichloroethyl ether |
| 1 | 3000 | | | 15.0 | 14.8 | 0.98 | 0.99 | 60 | 14.7 | 4.9 | 66.6 | 26.0 | 7.2 |
| 2 | 2989 | | | 27.9 | 26.8 | 1.50 | 1.44 | 10 | 26.1 | 8.7 | 50.4 | 29.9 | 12.5 |
| 3 | 3000 | | | 28.3 | 28.7 | 2.28 | 2.31 | 60 | 28.3 | 9.4 | 43.2 | 29.3 | 13.3 |
| 4 | 2425 | 625 | | 27.4 | 26.7 | 2.58 | 2.54 | 60 | 26.4 | 10.5 | 28.6 | 29.2 | 23.7 |
| 5 | 1200 | | 400 gms. CaCl₂ | 14.0 | 14.8 | 1.40 | 1.51 | 60 | 14.2 | 1.8 | 12.9 | 52.9 | 18.5 |
| 6 | 2800 | | 900 gms. NaCl | 29.5 | 30.2 | 2.32 | 2.40 | 60 | 29.3 | 10.5 | 18.5 | 47.0 | 22.9 |
| 7 | 1126 | | 374 gms. MgSO₄ | 14.5 | 15.2 | 1.13 | 1.17 | 60 | 14.8 | 13.2 | 21.9 | 43.1 | 23.0 |
| 8 | 1125 | | 375 gms. CuSO₄ | 14.3 | 14.7 | 1.86 | 1.94 | 60 | 14.3 | 12.7 | 21.4 | 45.0 | 27.6 |
| 9 | 2780 | | 900 gms. Na₂SO₄ | 21.4 | 22.2 | 2.85 | 3.01 | 60 | 21.5 | 7.7 | 23.9 | 27.7 | 30.0 | ene reacted per kilogram of water employed results in an increased yield of the dichloro-ethyl ether. Examples 2 and 3, when compared, show that a large change in reaction temperature does not alter appreciably the yield of ether. The small difference in yields of ether in Examples 2 and 3 is obviously due to the difference in proportions of ethylene reacted per kilogram of water used.

By comparing Example 4 with Example 3 it may be seen that the addition of a chlorohydrin to a hypochlorous acid solution prior to reacting ethylene therewith, results in a decided increase in the yield of dichloro-ethyl ether from the reaction. Examples 5–9, when compared with Example 3, show that by carrying the reactions out in the presence of water-soluble metal salts, especially sulphates, the yields of ether product are increased to an extent entirely out of proportion with the relatively small changes in ratio of reacted ethylene to water in said examples. Example 9 shows that sodium sulphate is a particularly active catalyst for the formation of the ether and that by carrying the reaction out in the presence of said salt, the ether can be produced as the principal reaction product.

Although the examples set forth in the table show only the changes in yields of beta-beta'-dichloro-ethyl ether from ethylene which result from certain changes in the reaction conditions, the yields of other dichloro-alkyl ethers from other normal olefines vary in similar manner with like changes in the reaction conditions.

In addition to the foregoing examples, we have also prepared dichloro-propyl ether and dichloro-butyl ether as follows:—

*Example 10*

Propylene and approximately its molecular equivalent of chlorine were passed separately, but simultaneously, into water, while stirring and maintaining the latter at about 60° C., until 1.2 gram moles of propylene had been reacted per kilogram of water used. The products were then separated by fractionally distilling the reaction mixture. The per cent of theoretical yields of the various products, based on the quantity of propylene reacted, were as follows:—propylene chlorohydrin, 60.8%; propylene chloride, 26.3%; and dichloro-propyl ether, 12.9%. The dichloro-propyl ether is a colorless liquid, boiling at approximately 185° C. at 760 millimeters and having the specific gravity 1.118 at 20° C. as compared with water at 4° C.

*Example 11*

Butylene-1 and approximately its molecular equivalent of chlorine were passed into water under conditions similar to those described in Example 10, until 0.95 gram mole of butylene had been reacted per kilogram of water used. The reacted mixture was fractionally distilled to separate the butylene chlorohydrin, butylene chloride, and dichloro-butyl ether products, said ether being obtained in 10 per cent of the theoretical yield, based on the quantity of butylene reacted. The dichloro-butyl ether is a new chemical compound having the empirical formula $C_8H_{16}OCl_2$. It is a colorless liquid boiling at approximately 220.9°–222.8° C. at 746 millimeters pressure, freezing at below −76° C., and having a specific gravity of approximately 1.074 at 20° C. with respect to water at the same temperature. It is useful both as an organic solvent and as an agent for the preparation of other chemical products.

Other normal olefines, e. g. normal amylenes, hexalenes, etc. can also be converted into the corresponding dichloro-alkyl ethers by our method. The dichloro-ether products, in all instances, have the general formula:—

Cl—alkyl—O—alkyl—Cl

In order to produce a dichloro-alkyl ether in good yield from a normal olefine higher than ethylene, e. g. propylene, only about 0.5 mole of the olefine need be reacted with aqueous hypochlorous acid per kilogram of water present in the acid, but, as hereinbefore stated, the yield of ether product becomes higher as the reaction is carried further.

In the following claims the expression "good yield" means at least 5 per cent of the theoretical yield, based on the quantity of olefine reacted.

In naming the dichloro-alkyl products mentioned herein, where a chlorine substituent is referred to as being in a "beta" position it is meant that said substituent is linked with a carbon atom adjacent to another carbon atom which is linked with the ether oxygen atom.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of making a beta-beta'-dichloro-alkyl ether having the general formula

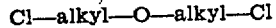
Cl—alkyl—O—alkyl—Cl the step which consists in reacting a normal olefine with an aqueous hypochlorous acid solution containing at least three gram moles of the chlorohydrin of said olefine per kilogram of water.

2. In a method of making a beta-beta'-dichloro-alkyl ether having the formula

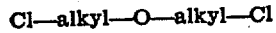
Cl—alkyl—O—alkyl—Cl wherein the two alkyl groups are identical and each contain more than two carbon atoms, the steps which consist in reacting a normal olefine, which contains more than two carbon atoms, with an aqueous hypochlorous acid solution containing the chlorohydrin of said olefine and a water-soluble metal sulphate, and thereafter separating the beta-beta'-dichloro-alkyl ether product.

3. In a method of making beta-beta'-dichloro-propyl ether, the steps which consist in simultaneously passing chlorine and propylene into water while stirring the latter until at least 0.5 gram mole of propylene has been reacted per kilogram of water used, and thereafter separating the beta-beta'-dichloro-propyl ether product.

4. In a method of making beta-beta'-dichloro-propyl ether, the steps which consist in simultaneously passing chlorine and between about one and about three times its molecular equivalent of propylene into an aqueous solution of a water-soluble metal sulphate, while stirring the latter, until more than 0.5 gram mole of propylene has been reacted per kilogram of water used, and thereafter separating the beta-beta'-dichloro-propyl ether product.

5. In a method of making beta-beta'-dichloro-propyl ether, the steps which consist in passing chlorine and approximately its molecular equivalent of propylene separately, but simultaneously, into an at least 3-normal aqueous solution of an alkali metal sulphate, while stirring said solution, until more than 0.5 gram mole of propylene has been reacted per kilogram of water used, and thereafter separating the dichloro-propyl ether product.

6. In a method of making a beta-beta'-dichloro-butyl ether, the steps which consist in reacting normal butylene with aqueous hypochlorous acid in the presence of the corresponding butylene chlorohydrin, and thereafter separating the beta-beta'-dichloro-butyl ether product.

7. In a method of making a beta-beta'-dichloro-butyl ether, the steps which consist in passing chlorine and approximately its molecular equivalent of normal butylene into an aqueous solution of a water-soluble metal salt until at least 0.5 gram mole of the butylene has been reacted per kilogram of water used, and thereafter separating the beta-beta'-dichloro-butyl ether product.

8. In a method of making a beta-beta'-dichloro-butyl ether, the steps which consist in passing chlorine and approximately its molecular equivalent of normal butylene into an aqueous solution of an alkali metal sulphate until at least 0.5 gram mole of the butylene has been reacted per kilogram of water used, and thereafter separating the beta-beta'-dichloro-butyl ether product.

9. In a method of making beta-beta'-dichloro-ethyl ether, the step which consists in reacting ethylene with an aqueous hypochlorous acid solution containing at least three gram moles of ethylene chlorohydrin per kilogram of water.

10. In a method of making beta-beta'-dichloro-ethyl ether, the step which consists in reacting ethylene with an aqueous hypochlorous acid solution containing at least five gram moles of ethylene chlorohydrin per kilogram of water.

11. In a method of making beta-beta'-dichloro-ethyl ether, the step which consists in passing chlorine and ethylene into water, while stirring the latter, until at least five gram moles of ethylene have been reacted per kilogram of water used.

12. In a method of making beta-beta'-dichloro-ethyl ether, the step which consists in passing chlorine and between about one and about three times its molecular equivalent of ethylene into an aqueous solution of a water-soluble metal salt, while stirring said solution, until at least five gram moles of ethylene have been reacted per kilogram of water used.

13. In a method of making beta-beta'-dichloro-ethyl ether, the steps which consist in passing chlorine and approximately its molecular equivalent of ethylene separately, but simultaneously, into an at least 3-normal aqueous solution of an alkali metal sulphate, while stirring said solution, until at least five gram moles of ethylene have been reacted per kilogram of water used, and thereafter separating the beta-beta'-dichloro-ethyl ether product.

14. In a method of making a dichloro-alkyl ether, wherein a normal olefine is reacted with an aqueous hypochlorous acid solution containing at least three gram moles of the chlorohydrin of said olefine per kilogram of water, the step which consists in promoting formation of the beta-beta'-dichloro-alkyl ether product by carrying the reaction out in the presence of a water-soluble metal salt.

15. In a method of making a dichloro-alkyl ether, wherein a normal olefine is reacted with an aqueous hypochlorous acid solution containing the chlorohydrin of said olefine, the step which consists in promoting formation of the beta-beta'-dichloro-alkyl ether product by carrying the reaction out in the presence of an alkali metal sulphate.

16. In a method of making dichloro-propyl ether, wherein propylene is reacted with an aqueous hypochlorous acid solution containing propylene chlorohydrin, the step which consists in promoting the formation of beta-beta'-dichloro-propyl ether by carrying the reaction out in the presence of a water-soluble metal sulphate.

17. In a method of making dichloro-butyl ether, wherein normal butylene is reacted with an aqueous hypochlorous acid solution containing the chlorohydrin of said butylene, the step which consists in promoting the formation of beta-beta'-dichloro-butyl ether by carrying the reaction out in the presence of an alkali metal sulphate.

18. In a method of making beta-beta'-dichloro-ethyl ether, wherein ethylene is reacted with an aqueous hypochlorous acid solution containing ethylene chlorohydrin, the step which consists in promoting the formation of beta-beta'-dichloro-ethyl ether by carrying the reaction out in the presence of a water-soluble metal sulphate.

19. In a method of making beta-beta'-dichloro-ethyl ether, wherein ethylene is reacted with an aqueous hypochlorous acid solution containing ethylene chlorohydrin, the step which consists in promoting the formation of beta-beta'-dichloro-ethyl ether by carrying the reaction out in the presence of an alkali metal sulphate.

20. Dichloro-butyl ether of empirical formula $C_8H_{16}OCl_2$, said compound being a liquid boiling at approximately 220.9°–222.8° C. at 746 millimeters pressure and having approximately the specific gravity 1.074 at 20° C.

21. In a method of making a beta-beta'-dichloro-alkyl ether having the general formula Cl—alkyl—O—alkyl—Cl the steps which consist in passing chlorine and a normal olefine into water while stirring the latter, the hydrogen chloride generated by the treatment remaining largely dissolved in the reacting mixture, and continuing said operation until at least 3 gram moles of the olefine have been reacted per kilogram of water employed.

22. In a method of making a beta-beta'-dichloro-alkyl ether having the general formula Cl—alkyl—O—alkyl—Cl wherein the two alkyl groups are identical and each contains more than two carbon atoms, the steps which consist in simultaneously passing chlorine and a normal olefine containing more than two carbon atoms into water while stirring the latter, the hydrogen chloride generated by the treatment remaining largely dissolved in the reacting mixture and thereafter separating the beta-beta'-dichloro-alkyl ether product.

23. In a method of making a beta-beta'-dichloro-propyl ether, the steps which consist in simultaneously passing chlorine and propylene into water while stirring the latter until at least 0.5 gram mole of propylene has been reacted per kilogram of water used, the hydrogen chloride generated by the reaction remaining largely dissolved in the reacting mixture, and thereafter separating the beta-beta'-dichloro-propyl ether product.

24. In a method for making a beta-beta'-dichloro-alkyl ether wherein an olefine is reacted with an aqueous hypochlorous acid solution, the improvement which consists in carrying the reaction out in the presence of a water-soluble metal sulphate.

25. In a method for making a beta-beta'-dichloro-alkyl ether wherein an olefine is reacted with an aqueous hypochlorous acid solution, the improvement which consists in carrying the reaction out in the presence of an alkali-metal sulphate.

HOWARD S. NUTTING.
EDGAR C. BRITTON.
DONALD H. CROOPE.

DISCLAIMER 2,095,612.—*Howard S. Nutting, Edgar C. Britton,* and *Donald H. Croope,* Midland, Mich. DICHLORO-ALKYL ETHERS. Patent dated October 12, 1937. Disclaimer filed September 26, 1940, by the assignee, *The Dow Chemical Company.*

Hereby enters this disclaimer to claim 22 of the said patent.

[*Official Gazette October 22, 1940.*]

solved in the reacting mixture, and thereafter separating the beta-beta'-dichloro-propyl ether product.

24. In a method for making a beta-beta'-dichloro-alkyl ether wherein an olefine is reacted with an aqueous hypochlorous acid solution, the improvement which consists in carrying the reaction out in the presence of a water-soluble metal sulphate.

25. In a method for making a beta-beta'-dichloro-alkyl ether wherein an olefine is reacted with an aqueous hypochlorous acid solution, the improvement which consists in carrying the reaction out in the presence of an alkali-metal sulphate.

HOWARD S. NUTTING.
EDGAR C. BRITTON.
DONALD H. CROOPE.

DISCLAIMER 2,095,612.—*Howard S. Nutting, Edgar C. Britton,* and *Donald H. Croope,* Midland, Mich. DICHLORO-ALKYL ETHERS. Patent dated October 12, 1937. Disclaimer filed September 26, 1940, by the assignee, *The Dow Chemical Company.*

Hereby enters this disclaimer to claim 22 of the said patent.

[*Official Gazette October 22, 1940.*]

DISCLAIMER 2,095,612.—*Howard S. Nutting, Edgar C. Britton*, and *Donald H. Croope*, Midland, Mich. DICHLORO-ALKYL ETHERS. Patent dated October 12, 1937. Disclaimer filed September 26, 1940, by the assignee, *The Dow Chemical Company*.

Hereby enters this disclaimer to claim 22 of the said patent.

[*Official Gazette October 22, 1940.*]